(12) United States Patent
Johnson et al.

(10) Patent No.: US 9,477,526 B2
(45) Date of Patent: Oct. 25, 2016

(54) CACHE UTILIZATION AND EVICTION BASED ON ALLOCATED PRIORITY TOKENS

(71) Applicant: NVIDIA Corporation, Santa Clara, CA (US)

(72) Inventors: Daniel Robert Johnson, Austin, TX (US); Minsoo Rhu, Austin, TX (US); James M. O'Connor, Austin, TX (US); Stephen William Keckler, Austin, TX (US)

(73) Assignee: NVIDIA Corporation, Santa Clara, CA (US)

( * ) Notice: Subject to any disclaimer, the term of this patent is extended or adjusted under 35 U.S.C. 154(b) by 236 days.

(21) Appl. No.: 14/147,395

(22) Filed: Jan. 3, 2014

(65) Prior Publication Data
US 2015/0067691 A1    Mar. 5, 2015

Related U.S. Application Data

(60) Provisional application No. 61/873,778, filed on Sep. 4, 2013.

(51) Int. Cl.
*G06F 9/50*    (2006.01)
*G06F 9/48*    (2006.01)

(52) U.S. Cl.
CPC ........... *G06F 9/5027* (2013.01); *G06F 9/5016* (2013.01); *G06F 9/48* (2013.01); *G06F 2209/5021* (2013.01); *Y02B 60/142* (2013.01)

(58) Field of Classification Search
None
See application file for complete search history.

(56) References Cited

U.S. PATENT DOCUMENTS

| | | | | |
|---|---|---|---|---|
| 8,504,691 B1* | 8/2013 | Tobler | ........... | H04L 67/02 370/229 |
| 2003/0069828 A1* | 4/2003 | Blazey | ........... | G06Q 10/10 705/37 |
| 2004/0088708 A1* | 5/2004 | Ramanujam | ........... | G06F 9/3851 718/107 |
| 2004/0215578 A1* | 10/2004 | Das | ........... | G06F 9/5027 705/77 |
| 2005/0138254 A1* | 6/2005 | Raghavan | ........... | G06F 13/37 710/240 |
| 2005/0138621 A1* | 6/2005 | Clark | ........... | G06F 9/52 718/100 |
| 2005/0188158 A1* | 8/2005 | Schubert | ........... | G06F 12/126 711/133 |
| 2007/0094664 A1* | 4/2007 | So | ........... | G06F 9/485 718/103 |
| 2007/0101033 A1* | 5/2007 | Chen | ........... | G06F 13/362 710/241 |
| 2008/0077721 A1* | 3/2008 | Terakawa | ........... | G06F 9/5011 710/240 |
| 2008/0112313 A1* | 5/2008 | Terakawa | ........... | G06F 9/5011 370/229 |
| 2008/0162760 A1* | 7/2008 | Jacob | ........... | G06F 13/362 710/244 |
| 2008/0250415 A1* | 10/2008 | Illikkal | ........... | G06F 9/5077 718/103 |
| 2009/0138682 A1* | 5/2009 | Capps, Jr. | ........... | G06F 9/30101 712/220 |
| 2010/0064109 A1* | 3/2010 | Bull | ........... | G06F 12/126 711/151 |

(Continued)

OTHER PUBLICATIONS

Li et al., Priority-Based Cache Allocation in Throughput Processors, 2015 IEEE 21st International Symposium on High Performance Computer Architecture (HPCA) Date of Conference, Feb. 2015.*

(Continued)

*Primary Examiner* — Benjamin Wu
(74) *Attorney, Agent, or Firm* — Zilka-Kotab, PC

(57) ABSTRACT

A system, method, and computer program product are provided for providing prioritized access for multithreaded processing. The method includes the steps of allocating threads to process a workload and assigning a set of priority tokens to at least a portion of the threads. Access to a resource, by each one of the threads, is based on the priority token assigned to the thread and the threads are executed by a multithreaded processor to process the workload.

18 Claims, 7 Drawing Sheets

(56) References Cited

U.S. PATENT DOCUMENTS

| | | | | |
|---|---|---|---|---|
| 2010/0083386 | A1* | 4/2010 | Kline | G06F 21/33 726/34 |
| 2011/0029978 | A1* | 2/2011 | Smolens | G06F 9/5016 718/103 |
| 2011/0167479 | A1* | 7/2011 | Maes | G06F 21/6281 726/4 |
| 2012/0159640 | A1* | 6/2012 | Cox | G06F 21/335 726/27 |
| 2013/0212270 | A1* | 8/2013 | Hsieh | H04L 67/32 709/225 |
| 2013/0254491 | A1* | 9/2013 | Coleman | G06F 12/126 711/133 |
| 2014/0068700 | A1* | 3/2014 | Reilly | H04L 63/20 726/1 |
| 2015/0032794 | A1* | 1/2015 | Mittal | H04L 47/215 709/202 |

OTHER PUBLICATIONS

Rogers, T. G. et al., "Cache-Conscious Wavefront Scheduling," In proceedings of the 45th IEEE/ACM International Symposium on Microarchitecture (MICRO-45), Dec. 2012, pp. 1-12.

Jog, A. et al., "OWL: Cooperative Thread Array Aware Scheduling Techniques for Improving GPGPU Performance," ASPLOS' 13, Mar. 16-20, 2013, pp. 1-12.

Gebhart, M. et al., "A Hierarchical Thread Scheduler and Register File for Energy-efficient Throughput Processors," ACM Transactions on Computer Systems, 2012, pp. 1-38.

Qureshi, M. K. et al., Utility-Based Cache Partitioning: A Low-Overhead, High-Performance, Runtime Mechanism to Partition Shared Caches, The 39th Annual IEEE/ACM International Symposium on Microarchitecture (MICRO'06), 2006, pp. 1-10.

Jaleel, A. et al., High Performance Cache Replacement Using Re-Reference Interval Prediction (PRIP), ISCA'10, Jun. 19-23, 2010, pp. 1-12.

Iyer, R. et al., "QoS Policies and Architecture for Cache/Memory in CMP Platforms," SIGMETRICS'07, Jun. 12-16, 2007, pp. 1-12.

* cited by examiner

US 9,477,526 B2

CACHE UTILIZATION AND EVICTION BASED ON ALLOCATED PRIORITY TOKENS

CLAIM OF PRIORITY

This application claims the benefit of U.S. Provisional Application No. 61/873,778, filed Sep. 4, 2013, the entire contents of which is incorporated herein by reference.

This invention was made with Government support under LLNS subcontract B599861 awarded by DOE, and with Government support under Agreement HR0011-13-3-0001 awarded by DARPA. The Government has certain rights in this invention.

FIELD OF THE INVENTION

The present invention relates to multithreaded processing, and more particularly to providing prioritized access to processor resources.

BACKGROUND

Some conventional processors leverage massive multithreading as a technique for hiding latency and achieving high performance. Regularly structured, compute-intensive applications can readily utilize the high peak memory bandwidth and ample computational resources of a graphics processing unit (GPU) to great effect. In particular, regularly structured applications with high spatial and temporal locality can efficiently utilize cache resources. However, not all applications can be re-factored to exhibit regular control flow and memory access patterns, and many emerging GPU applications suffer from inefficient utilization of cache resources. Specifically, applications can suffer from cache thrashing due to large thread count, small cache sizes, and limited cache capacity per thread.

When the massively multithreaded nature of GPUs is combined with irregular memory access patterns, little effective cache capacity may be available per thread, resulting in high cache miss rates and reducing the amount of temporal locality that can be exploited. Such behavior often results in low reuse of cache blocks, both temporally and spatially, and may waste memory bandwidth, on-chip storage, and dynamic random access memory (DRAM) power. Thus, there is a need for addressing this issue and/or other issues associated with the prior art.

SUMMARY

A system, method, and computer program product are provided for providing prioritized access to processor resources in a multithreaded processing environment. The method includes the steps of allocating threads to process a workload and assigning a set of priority tokens to at least a portion of the threads. Access to a resource, by each one of the threads, is based on the priority token assigned to the thread and the threads are executed by a multithreaded processor to process the workload.

DETAILED DESCRIPTION

A priority-based resource management technique for massively threaded processors with limited resources may be used to provide prioritized access to the limited resources during multithreaded processing. For example, when per-thread cache capacity is limited, the priority-based technique may improve reuse of cache blocks, both temporally and spatially. Priority tokens may be assigned to software entities (e.g., threads or thread groups) that specify a priority for each thread to perform various cache actions, including allocation (fill) and replacement (eviction). In addition to influencing caching, the priority tokens may also be used to influence other memory system resources and interconnect resources.

In one embodiment, mechanisms and policies for assignment, transfer, and release of the priority tokens may be provided. When using a token priority-based approach for implementing resource access policies, priority tokens may be allocated, assigned, transferred, and released to influence performance, throughput, and/or power consumption.

Figure 1:
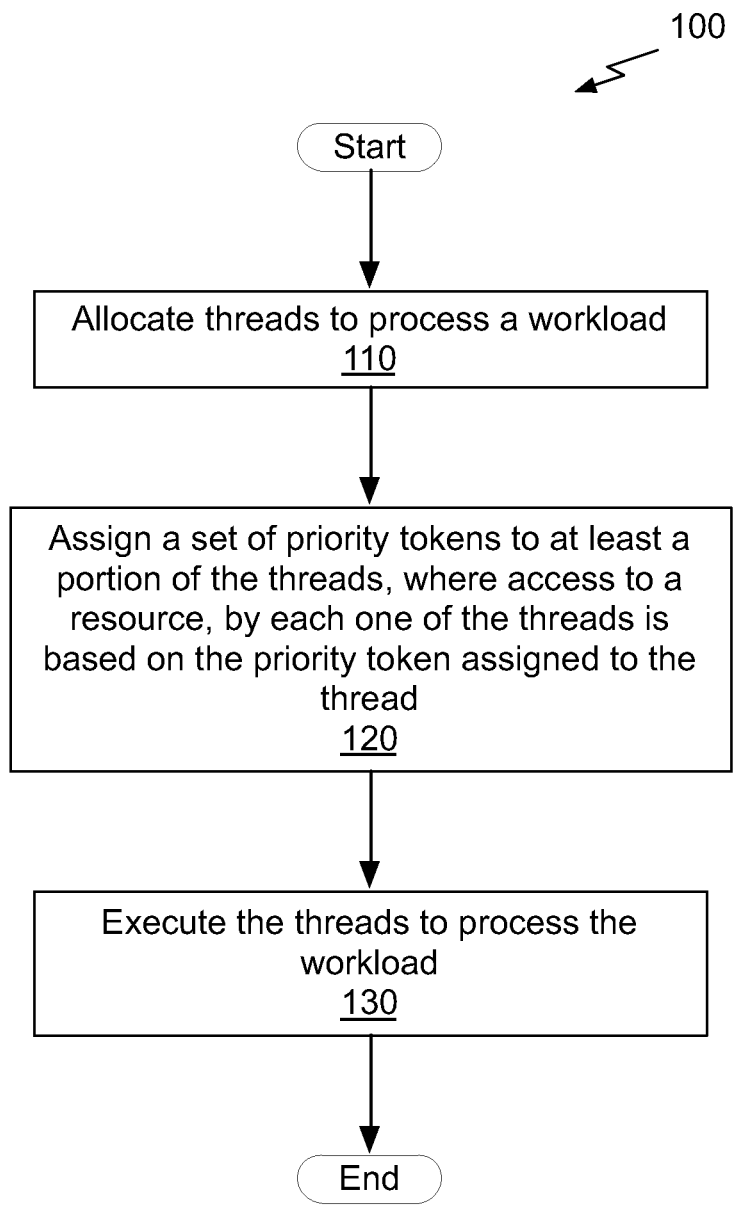
FIG. 1 illustrates a flowchart of a method for providing prioritized access for multithreaded processing, in accordance with one embodiment.

FIG. 1 illustrates a flowchart of a method 100 for providing prioritized access for multithreaded processing, in accordance with one embodiment. At step 110, threads are allocated to process a workload. In the context of the present description, a thread (i.e., a thread of execution) is an instantiation of a set of instructions executing within a multithreaded processor and the workload is the set of instructions and any input data to be processed by the set of instructions. The multithreaded processor may be a graphics processor, a general purpose processor, or any other type of processor configured to execute two or more threads in parallel.

At step 120, a set of priority tokens is assigned to at least a portion of the threads. Access to a resource, by each one of the threads, is based on the priority token assigned to the thread. In the context of the present description, the resource may include one or more of cache storage, communication or interconnect bandwidth, and a scheduler, processing pipeline or processing unit. A priority token may specify a single priority for all resources accessed by the thread or a priority for at least one resource accessed by the thread. One or more additional priority tokens may be used to enable access priority for different resources or a different combination of resources that may be accessed by a thread.

At step 130, the threads are executed by a multithreaded processor to process the workload. In one embodiment, the priority token assigned to a first thread may be released and/or transferred to a second thread during execution of the first thread. The priority tokens are utilized to grant threads priority access to resources during execution of the workload.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
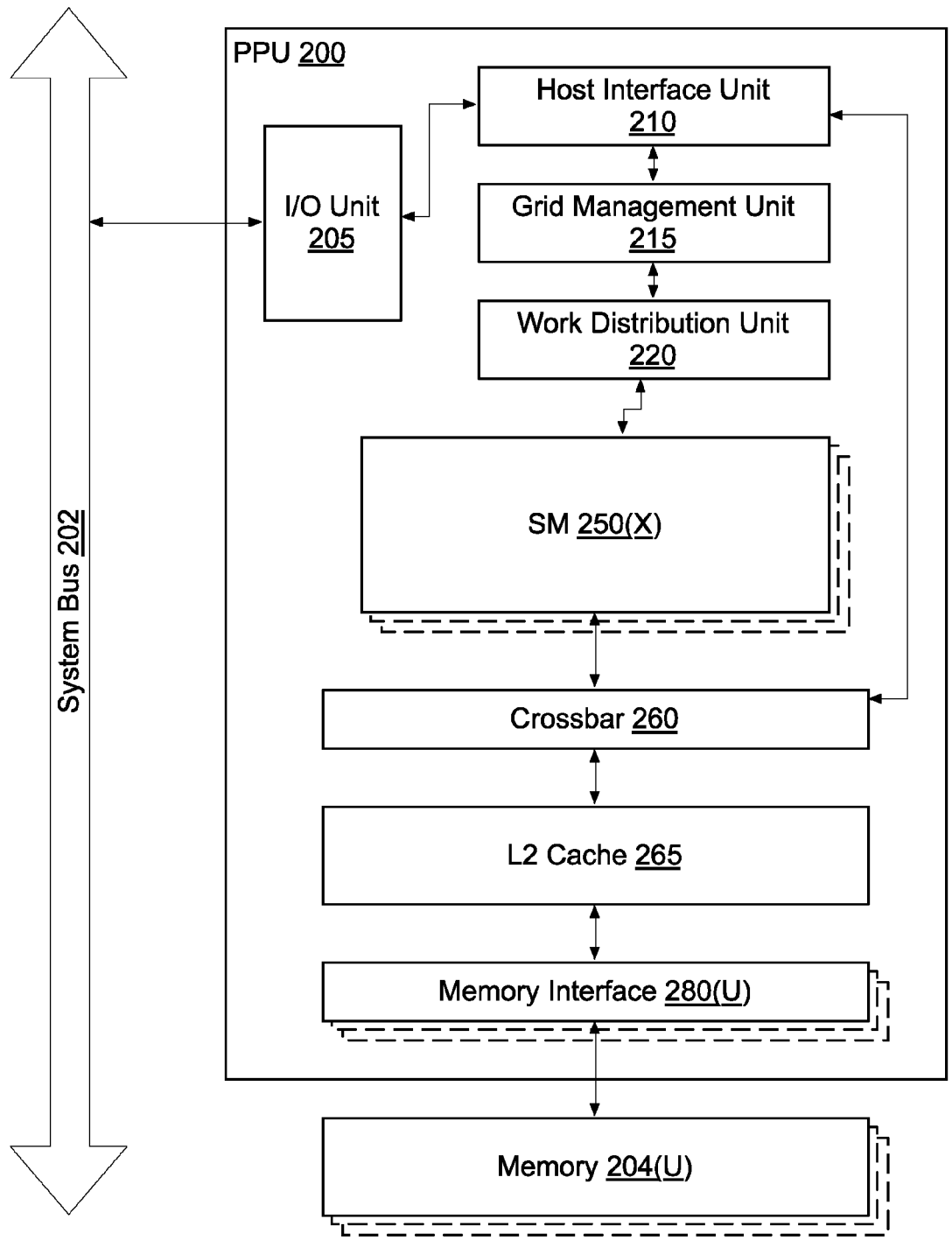
FIG. 2 illustrates a parallel processing unit (PPU), according to one embodiment.

FIG. 2 illustrates a parallel processing unit (PPU) 200, according to one embodiment. While a parallel processor is provided herein as an example of the PPU 200, it should be strongly noted that such processor is set forth for illustrative purposes only, and any processor may be employed to supplement and/or substitute for the same. In one embodiment, the PPU 200 is configured to execute a plurality of threads concurrently in two or more streaming multi-processors (SMs) 250. A thread (i.e., a thread of execution) is an instantiation of a set of instructions executing within a particular SM 250. Each SM 250, described below in more detail in conjunction with FIG. 3, may include, but is not limited to, one or more processing cores, one or more load/store units (LSUs), a level-one (L1) cache, shared memory, and the like.

In one embodiment, the PPU 200 includes an input/output (I/O) unit 205 configured to transmit and receive communications (i.e., commands, data, etc.) from a central processing unit (CPU) (not shown) over the system bus 202. The I/O unit 205 may implement a Peripheral Component Interconnect Express (PCIe) interface for communications over a PCIe bus. In alternative embodiments, the I/O unit 205 may implement other types of well-known bus interfaces.

The PPU 200 also includes a host interface unit 210 that decodes the commands and transmits the commands to the grid management unit 215 or other units of the PPU 200 (e.g., memory interface 280) as the commands may specify. The host interface unit 210 is configured to route communications between and among the various logical units of the PPU 200.

In one embodiment, a program encoded as a command stream is written to a buffer by the CPU. The buffer is a region in memory, e.g., memory 204 or system memory, that is accessible (i.e., read/write) by both the CPU and the PPU 200. The CPU writes the command stream to the buffer and then transmits a pointer to the start of the command stream to the PPU 200. The host interface unit 210 provides the grid management unit (GMU) 215 with pointers to one or more streams. The GMU 215 selects one or more streams and is configured to organize the selected streams as a pool of pending grids. The pool of pending grids may include new grids that have not yet been selected for execution and grids that have been partially executed and have been suspended.

A work distribution unit 220 that is coupled between the GMU 215 and the SMs 250 manages a pool of active grids, selecting and dispatching active grids for execution by the SMs 250. Pending grids are transferred to the active grid pool by the GMU 215 when a pending grid is eligible to execute, i.e., has no unresolved data dependencies. An active grid is transferred to the pending pool when execution of the active grid is blocked by a dependency. When execution of a grid is completed, the grid is removed from the active grid pool by the work distribution unit 220. In addition to receiving grids from the host interface unit 210 and the work distribution unit 220, the GMU 215 also receives grids that are dynamically generated by the SMs 250 during execution of a grid. These dynamically generated grids join the other pending grids in the pending grid pool.

In one embodiment, the CPU executes a driver that implements an application programming interface (API) that enables one or more applications executing on the CPU to schedule operations for execution on the PPU 200. An application may include instructions (i.e., API calls) that cause the driver to generate one or more grids for execution. In one embodiment, the PPU 200 implements a SIMD (Single-Instruction, Multiple-Data) architecture where each thread block (i.e., warp) in a grid is concurrently executed on a different data set by different threads in the thread block. The driver defines thread blocks that are comprised of k related threads, such that threads in the same thread block may exchange data through shared memory. In one embodiment, a thread block comprises 32 related threads and a grid is an array of one or more thread blocks that execute the same stream and the different thread blocks may exchange data through global memory.

In one embodiment, the PPU 200 comprises X SMs 250(X). For example, the PPU 200 may include 15 distinct SMs 250. Each SM 250 is multi-threaded and configured to execute a plurality of threads (e.g., 32 threads) from a particular thread block concurrently. Each of the SMs 250 is connected to a level-two (L2) cache 265 via a crossbar 260 (or other type of interconnect network). The L2 cache 265 is connected to one or more memory interfaces 280. Memory interfaces 280 implement 16, 32, 64, 128-bit data buses, or the like, for high-speed data transfer. In one embodiment, the PPU 200 comprises U memory interfaces 280(U), where each memory interface 280(U) is connected to a corresponding memory device 204(U). For example, PPU 200 may be connected to up to 6 memory devices 204, such as graphics double-data-rate, version 5, synchronous dynamic random access memory (GDDR5 SDRAM).

In one embodiment, the PPU 200 implements a multi-level memory hierarchy. The memory 204 is located off-chip in SDRAM coupled to the PPU 200. Data from the memory 204 may be fetched and stored in the L2 cache 265, which is located on-chip and is shared between the various SMs 250. In one embodiment, each of the SMs 250 also implements an L1 cache. The L1 cache is private memory that is dedicated to a particular SM 250. Each of the L1 caches is coupled to the shared L2 cache 265. Data from the L2 cache 265 may be fetched and stored in each of the L1 caches for processing in the functional units of the SMs 250.

In one embodiment, the PPU 200 comprises a graphics processing unit (GPU). The PPU 200 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. Attributes may include one of more of position, color, surface normal vector, texture coordinates, etc. The PPU 200 can be configured to process the graphics primitives to generate a frame buffer (i.e., pixel data for each of the pixels of the display). The driver implements a graphics processing pipeline, such as the graphics processing pipeline defined by the OpenGL API.

An application writes model data for a scene (i.e., a collection of vertices and attributes) to memory. The model data defines each of the objects that may be visible on a display. The application then makes an API call to the driver that requests the model data to be rendered and displayed. The driver reads the model data and writes commands to the buffer to perform one or more operations to process the model data. The commands may encode different shader programs including one or more of a vertex shader, hull shader, geometry shader, pixel shader, etc. For example, the GMU 215 may configure one or more SMs 250 to execute a vertex shader program that processes a number of vertices defined by the model data. In one embodiment, the GMU 215 may configure different SMs 250 to execute different shader programs concurrently. For example, a first subset of SMs 250 may be configured to execute a vertex shader program while a second subset of SMs 250 may be configured to execute a pixel shader program. The first subset of SMs 250 processes vertex data to produce processed vertex data and writes the processed vertex data to the L2 cache 265 and/or the memory 204. After the processed vertex data is rasterized (i.e., transformed from three-dimensional data into two-dimensional data in screen space) to produce fragment data, the second subset of SMs 250 executes a pixel shader to produce processed fragment data, which is then blended with other processed fragment data and written to the frame buffer in memory 204. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The PPU 200 may be included in a desktop computer, a laptop computer, a tablet computer, a smart-phone (e.g., a wireless, hand-held device), personal digital assistant (PDA), a digital camera, a hand-held electronic device, and the like. In one embodiment, the PPU 200 is embodied on a single semiconductor substrate. In another embodiment, the PPU 200 is included in a system-on-a-chip (SoC) along with one or more other logic units such as a reduced instruction set computer (RISC) CPU, a memory management unit (MMU), a digital-to-analog converter (DAC), and the like.

In one embodiment, the PPU 200 may be included on a graphics card that includes one or more memory devices 204 such as GDDR5 SDRAM. The graphics card may be configured to interface with a PCIe slot on a motherboard of a desktop computer that includes, e.g., a northbridge chipset and a southbridge chipset. In yet another embodiment, the PPU 200 may be an integrated graphics processing unit (iGPU) included in the chipset (i.e., Northbridge) of the motherboard.

Figure 3:
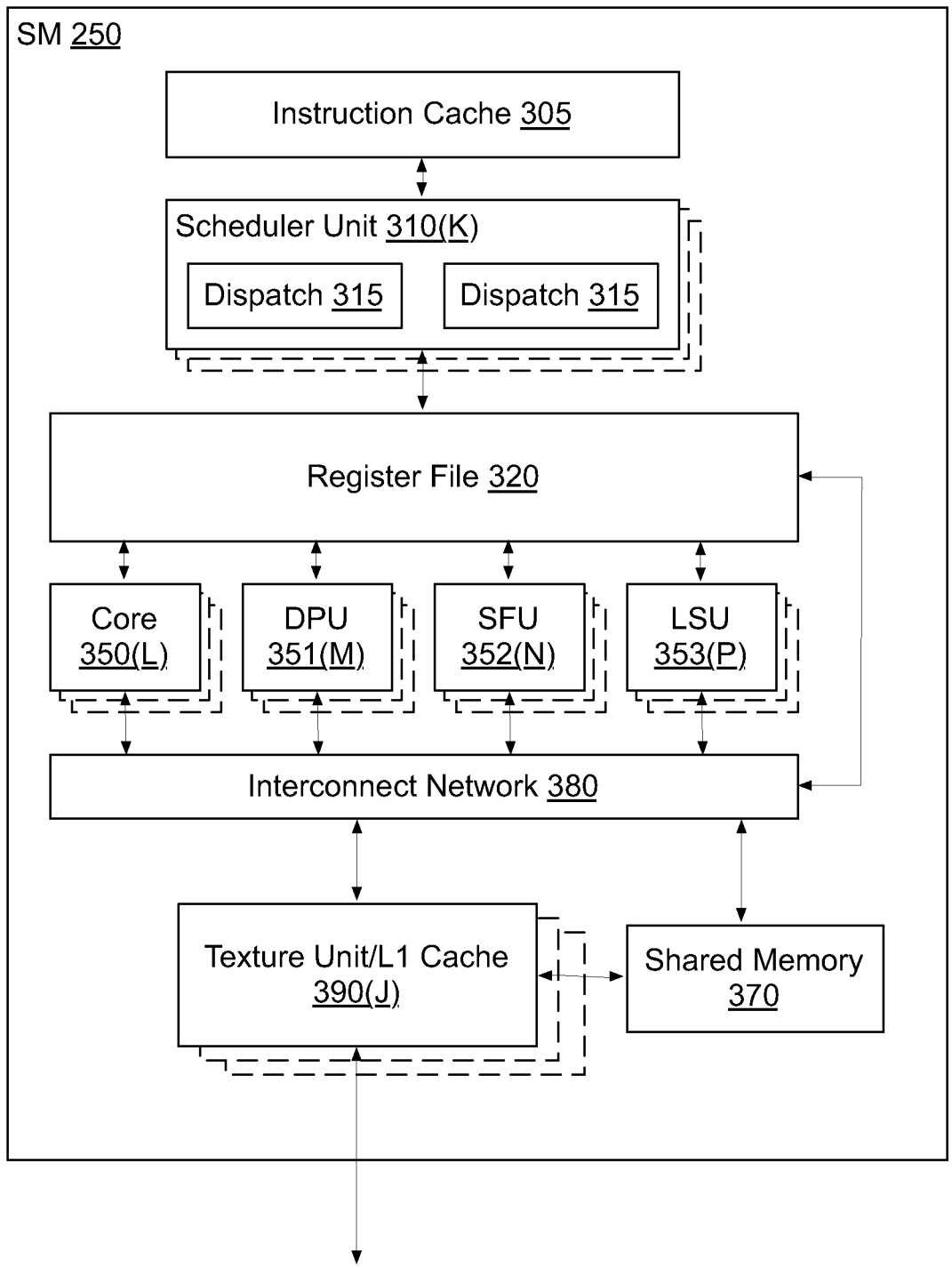
FIG. 3 illustrates the streaming multi-processor of FIG. 2, according to one embodiment.

FIG. 3 illustrates the streaming multi-processor 250 of FIG. 2, according to one embodiment. As shown in FIG. 3, the SM 250 includes an instruction cache 305, one or more scheduler units 310, a register file 320, one or more processing cores 350, one or more double precision units (DPUs) 351, one or more special function units (SFUs) 352, one or more load/store units (LSUs) 353, an interconnect network 380, a shared memory 370, and one or more texture unit/L1 caches 390.

As described above, the work distribution unit 220 dispatches active grids for execution on one or more SMs 250 of the PPU 200. The scheduler unit 310 receives the grids from the work distribution unit 220 and manages instruction scheduling for one or more thread blocks of each active grid. The scheduler unit 310 schedules threads for execution in groups of parallel threads, where each group is called a warp. In one embodiment, each warp includes 32 threads. The scheduler unit 310 may manage a plurality of different thread blocks, allocating the thread blocks to warps for execution and then scheduling instructions from the plurality of different warps on the various functional units (i.e., cores 350, DPUs 351, SFUs 352, and LSUs 353) during each clock cycle.

In one embodiment, each scheduler unit 310 includes one or more instruction dispatch units 315. Each dispatch unit 315 is configured to transmit instructions to one or more of the functional units. In the embodiment shown in FIG. 3, the scheduler unit 310 includes two dispatch units 315 that enable two different instructions from the same warp to be dispatched during each clock cycle. In alternative embodiments, each scheduler unit 310 may include a single dispatch unit 315 or additional dispatch units 315.

Each SM 250 includes a register file 320 that provides a set of registers for the functional units of the SM 250. In one embodiment, the register file 320 is divided between each of the functional units such that each functional unit is allocated a dedicated portion of the register file 320. In another embodiment, the register file 320 is divided between the different warps being executed by the SM 250. The register file 320 provides temporary storage for operands connected to the data paths of the functional units.

Each SM 250 comprises L processing cores 350. In one embodiment, the SM 250 includes a large number (e.g., 192, etc.) of distinct processing cores 350. Each core 350 is a fully-pipelined, single-precision processing unit that includes a floating point arithmetic logic unit and an integer arithmetic logic unit. In one embodiment, the floating point arithmetic logic units implement the IEEE 754-2008 standard for floating point arithmetic. Each SM 250 also comprises M DPUs 351 that implement double-precision floating point arithmetic, N SFUs 352 that perform special functions (e.g., copy rectangle, pixel blending operations, and the like), and P LSUs 353 that implement load and store operations between the shared memory 370 and the register file 320 via the J texture unit/L1 caches 390 and the interconnect network 380. The J texture unit/L1 caches 390 are coupled between the interconnect network 380 and the shared memory 370 and are also coupled to the crossbar 260. In one embodiment, the SM 250 includes 64 DPUs 351, 32 SFUs 352, and 32 LSUs 353. In another embodiment, the L1 cache is not included within the texture unit and is instead included with the shared memory 370 with a separate direct connection to the crossbar 260.

Each SM 250 includes an interconnect network 380 that connects each of the functional units to the register file 320 and to the shared memory 370 through the interconnect network 380. In one embodiment, the interconnect network 380 is a crossbar that can be configured to connect any of the functional units to any of the registers in the register file 320, to any of the J texture unit/L1 caches 390, or the memory locations in shared memory 370.

In one embodiment, the SM 250 is implemented within a GPU. In such an embodiment, the SM 250 comprises J texture unit/L1 caches 390. The texture unit/L1 caches 390 are configured to access texture maps (i.e., a 2D array of texels) from the memory 204 and sample the texture maps to produce sampled texture values for use in shader programs. The texture unit/L1 caches 390 implement texture operations such as anti-aliasing operations using mip-maps (i.e., texture maps of varying levels of detail). In one embodiment, the SM 250 includes 16 texture unit/L1 caches 390. As described further herein, the texture unit/L1 caches 390 are also configured to receive load and store requests from the LSUs 353 and to coalesce the texture accesses and the load and store requests to generate coalesced memory operations that are output to a memory system that includes the shared memory 370. The memory system may also include the L2 cache 265, memory 204, and a system memory (not shown).

The PPU 200 described above may be configured to perform highly parallel computations much faster than conventional CPUs. Parallel computing has advantages in graphics processing, data compression, biometrics, stream processing algorithms, and the like.

As previously explained in conjunction with FIG. 1, a priority-based resource management technique may be used to provide prioritized access to the limited resources during multithreaded processing. Examples of resources that may be accessed using a priority-based scheme include the texture unit/L1 cache 390, the register file 320, the functional units (e.g., cores 350, DPUs 351, SFUs 352, and LSUs 353), the interconnect network 380, the shared memory 370, the crossbar 260, the L2 cache 265, the memory interface 280, and the memory 204. The scheduler unit 310 may be configured to assign a priority token to each thread that specifies an access priority granted to the thread when accessing one or more of the resources. The scheduler unit 310 may be configured in response to a program instruction, software controlled operating mode, or circuitry implementing the scheduler unit 310 in order to control the assignment of priority tokens. In one embodiment, the priority token may be used to specify a scheduling priority used by the scheduler unit 310 to determine which threads to select for output to the dispatch unit(s) 315. Alternatively, threads that are assigned a priority token for priority access of a resource may be given scheduling priority by the scheduler unit 310.

Figure 4A:
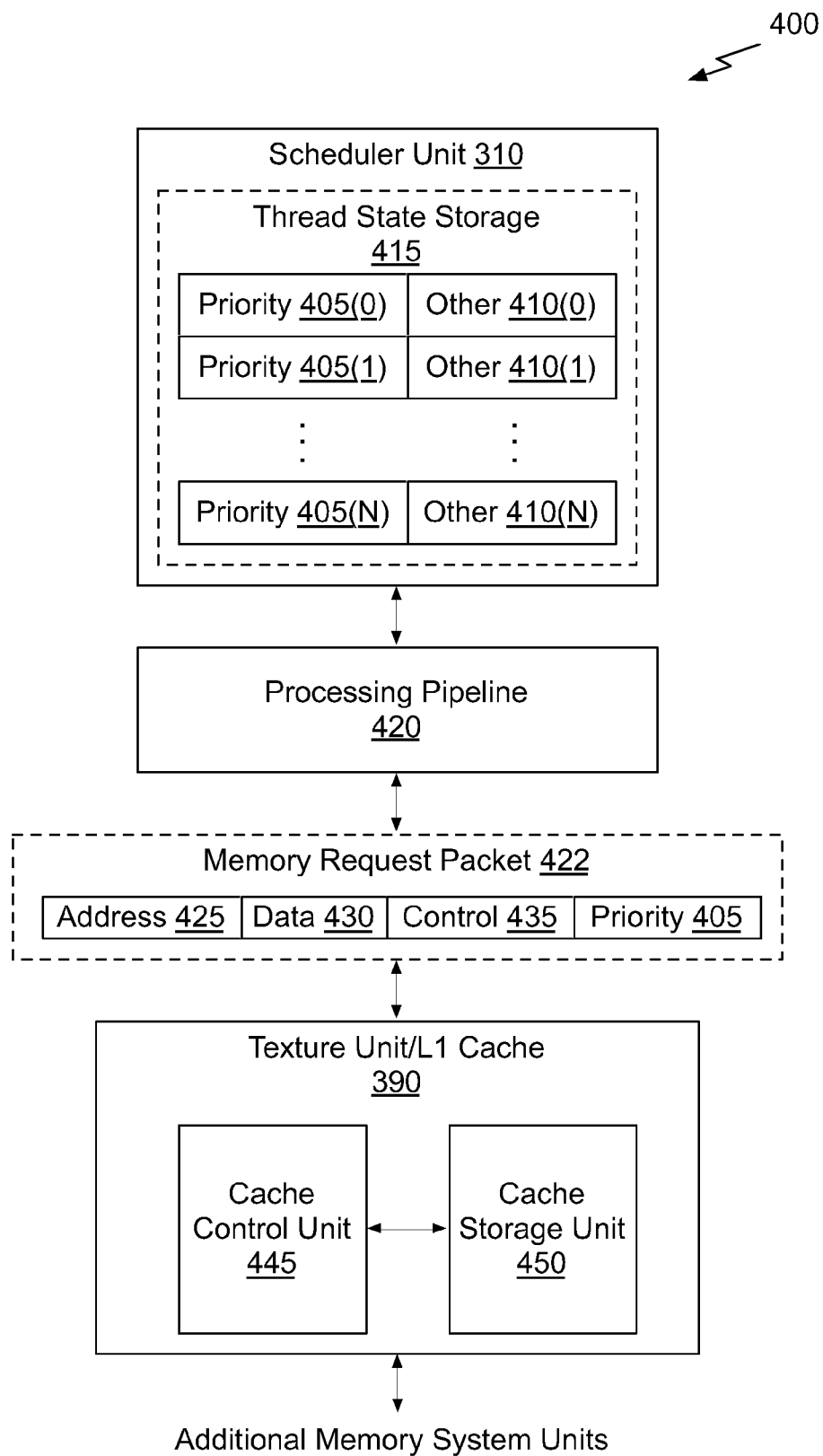
FIG. 4A illustrates units shown in FIG. 3 that are configured to implement the prioritized access for multithreaded processing, in accordance with another embodiment.

FIG. 4A illustrates units shown in FIG. 3 that are configured to implement prioritized access to processor resources in a multithreaded processing environment, in accordance with another embodiment. Although the behavior of the units shown in FIG. 3 is described in the context of a cache storage resource of a memory system, prioritized access may be for other resources. In particular, priority tokens may be used to provide prioritized access for other memory system resources or interconnect resources. Additionally, although the priority tokens are described as being assigned to individual threads, a priority token may be assigned to a group of threads, such as a warp.

Furthermore, although the allocation of the priority tokens is described as being performed by the scheduler unit 310, other units in the PPU 200 may be configured to perform at least a portion of the priority token allocation. For example, the work distribution unit 220 may be configured to allocate priority tokens and provide the allocated priority tokens to the SM 250 to assign to particular threads and manage. Distributing the allocation of priority tokens and management of priority tokens in such a manner may be particularly applicable to provide prioritized access to memory system resources having limited capacity, such as the L2 cache 265. The work distribution unit 220 may be configured to determine that a given kernel-launch only uses 12 of 15 SMs 250 in a particular embodiment of the PPU 200, so the work distribution unit 220 may allocate ¹⁄₁₂th of the total priority tokens of a type that enables priority access to the L2 cache 265 to each thread group that is sent to one of the 12 SMs 250. In other words, the work distribution unit 220 may be configured to manage the number of priority tokens of one or more types that are allocated to an SM 250 or a thread group while the scheduler unit 310 manages the fine-grained assignment of the allocated priority tokens to threads or warps. When a kernel exits the SM 250, the priority tokens assigned to the exiting threads or warps may be returned to the work distribution unit 220 for reallocation.

The scheduler unit 310 includes a thread state storage 415 that is updated as needed to track the state of each thread. For each thread that may be allocated to execute a sequence of instructions, the thread state storage 415 stores one or more priority tokens 405 and other state 410. The other state 410 may indicate whether the thread state is allocated, a program counter corresponding to an instruction, a flag indicating whether an allocated thread is active or idle, and other state associated with a thread that is allocated or available to be allocated.

A priority token 405 may be associated with an individual resource or with a combination of resources, so that different priority token types may be used. Examples of the different resources to which access may be controlled via priority tokens individually or in combination include the register file 320, the shared memory 370, the texture unit/L1 cache 290, the interconnect network 380, the crossbar 260, the memory interface 280, the memory 204, and the L2 cache 265.

For example, a first type of priority token 405 may be used to enable/disable priority access for the texture unit/L1 cache 390 and a second type of priority token 405 may be used to enable/disable priority access for the L2 cache 265. In another embodiment, a first type of priority token 405 may be used to enable/disable priority access for a first portion of the memory system resources (e.g., the texture unit L1 cache 290, the register file 320, the shared memory 370 and the interconnect network 380) and a second type of priority token 405 may be used to enable/disable priority access for a second portion of the memory system resources (e.g., the L2 cache 265 and the memory 204) and interconnect resources (e.g., the crossbar 260 and the memory interface 280). The first and/or second type of priority token 405 may be configured to represent two or more levels of priority access.

In one embodiment, the quantity of each type of priority token 405 may be limited so that only a portion of the allocated threads may be assigned priority tokens 405 of a particular type. A priority limit may be defined for each type of priority token 405. Alternatively, a priority limit may be defined for an individual resource or for each resource combination. In one embodiment, the priority limit is the maximum number of allocated threads for which access priority is enabled. For example, a first priority token type may enable/disable access priority for an L1 cache and second priority token type may enable/disable access priority for an L2 cache. A thread that is assigned a priority token 405 of the first priority token type has priority access enabled for the L1 cache. A thread that is assigned a priority token 405 of the second priority token type has priority access enabled for the L2 cache. A single thread may be assigned priority tokens 405 of the first and second types. In one embodiment, each priority token 405 may be implemented using a single bit that is set to TRUE for a thread to which a priority token 405 is assigned. In one embodiment, instead of using two separate types of priority tokens 405, a single priority token type is used, and threads that are assigned a priority token 405 have the bit set to TRUE and have priority enabled for accessing the L1 cache while threads that are not assigned a priority token 405 have the bit set to FALSE and have priority enabled for accessing the L2 cache. In other embodiments, two or more bits may be used to encode the priority token 405 and two or more different priority types (e.g., priority levels or combinations of access in terms of access to memory system and/or interconnect resources) may be supported.

The priority limit for each token type may be the same or different and may be static or may change dynamically. In one embodiment, a hill climbing algorithm may be used to dynamically tune the priority limit(s) for performance. For example, the scheduler unit 310 may be configured to successively decrease a first priority limit specified for a priority token 405 that enables access priority for an L1 cache when the number of cache line hits in the L1 cache is less than or equal to a threshold value. In another embodiment, priority limit(s) may be adjusted to optimize for different interleavings of data stored in a memory and specific sequences of program instructions. For example, when a number of threads having a particular program counter reaches a threshold value, a priority limit may be increased or decreased to modify the number of threads that have priority access to a particular resource for the execution of the specific sequence of program instructions. The priority limits may be determined by software, hardware, or a combination of software and hardware.

The assignment of a set of priority tokens 405 to threads may be performed using a variety of different policies, where each priority token 405 in the set is of the same type and the number of priority tokens 405 in the set does not exceed the priority limit for the type. In one embodiment, thread age is used to determine the assignment of priority tokens 405 so that the N oldest allocated threads are assigned N priority tokens 405 in the set. In another embodiment, the scheduler unit 310 may be configured to evenly distribute the number of priority tokens 405 in a set between one or more thread groups when assigning tokens to the allocated threads. In one embodiment, priority tokens 405 are only assigned to allocated threads that are eligible to be dispatched for execution. In other words, priority tokens 405 are only assigned to allocated threads whose execution is not blocked waiting for another event (e.g., read or write access to complete). In another embodiment, the scheduler unit 310 may be configured to use working set prediction to determine which allocated threads can "coexist" or access a cache (e.g., texture unit/L2 cache 390 and/or L2 cache 265) with minimal thrashing and the scheduler unit 310 may assign priority tokens 405 to allocated threads that can coexist.

A set of priority tokens 405 may be divided into two or more subsets for assignment to allocated threads. For example a first subset may be allocated to the oldest allocated threads and a second subset may be allocated to the remaining allocated threads. Assuming the priority token type provides access priority for a cache resource, the first subset provides guaranteed cache usage permission for the oldest allocated threads. When the access priority is enabled for each oldest allocated thread until the thread exits, the access priority provided by the priority tokens 405 may be exchanged between different threads at certain intervals, such as when a specified number of cycles or cache access requests have occurred. The second subset provides the remaining allocated threads with some cache access and the priority tokens 405 may be exchanged between different threads at a faster rate because the threads need not exit before the priority token 405 is released and reassigned (i.e., exchanged or transferred) to another thread.

One or more priority tokens 405 may be used by the scheduler unit 310 to influence scheduling decisions or a selection process when threads are selected for execution. The scheduler unit 310 outputs threads that are selected for execution to the dispatch unit(s) 315 and the priority token(s) 405 associated with each thread are provided to the dispatch unit(s) 315. In another embodiment, the dispatch unit(s) 315 or the LSUs 353 read the priority tokens associated with each executing thread. The dispatch unit(s) 315 output threads and associated priority tokens to the processing pipeline 420 that includes the functional units of the SM 250. The one or more load/store unit(s) 353 in the processing pipeline 420 may output a memory request packet 422 to store processed data 430 that is generated during execution of a thread to the memory system or to load data from the memory system during execution of a thread. The memory system may include one or more of the shared memory 370, the register file 320, the texture unit/L1 caches 390, the interconnect network 380, the L2 cache 265, and the memory 204. The memory system may also include the interconnect resources (e.g., the crossbar 260 and the memory interface 280). The memory request packet 422 also includes an address 425, control 435, and the priority token(s) 405 assigned to the thread which generated the memory request packet 422. The control 435 may specify the memory operation (e.g., read or write).

When the priority token(s) 405 specify an access priority (e.g., levels, enabled, or disabled) for a cache resource, such as the texture unit/L1 cache 390, various cache actions may be performed for the thread based on the access priority token(s) 405. For example, a priority token may be used to specify per-thread priority for allocation (i.e., fill) and replacement (i.e., eviction) of entries in the cache. The priority token(s) 405 assigned to the thread may be stored in a cache control unit 445 and may be associated with the cache line in a cache storage unit 450 that is allocated to store the processed data 430 for a write operation or to store data for a read operation.

The cache control unit 445 may be configured to implement an "opportunistic caching" policy where threads (or warps) with higher priority (i.e., assigned a priority token) are allowed to use the texture unit/L1 cache 390 as normal, filling new data and evicting old data. Threads (warps) with lower priority may opportunistically use cache space when entries or blocks do not contain higher priority data, but the lower priority threads (i.e., not assigned a priority token or holding a lower priority token) are restricted from evicting other data based on priority. The cache control unit 445 may also be configured to take priority into account when selecting eviction candidates to implement a replacement policy.

In one embodiment, different levels of a priority token 405 can be defined to allow more than two priority levels (e.g., enabled and disabled priority). For example, a first priority token level may indicate guaranteed access to a cache (strongly cached). Threads assigned a lower priority token level defer to threads that are assigned the first priority token level, and threads that are not assigned a priority token 405 have no cache access privilege. Only threads holding a higher or equivalent priority token 405 may induce eviction of cached data marked with a given priority token level.

The cache control unit 445 may be configured to determine whether a memory request packet 422 generated for a first thread has priority compared with entries in the cache storage unit 450 associated with any other threads. The priority token(s) 405 may be used by the cache control unit 445 to determine whether to allocate a cache entry to the thread. When no entry is available to be allocated, the priority tokens 405 stored in the cache control unit 445 may be used to determine a replacement policy and identify a cache entry to be evicted (i.e., victim selection).

Figure 4B:
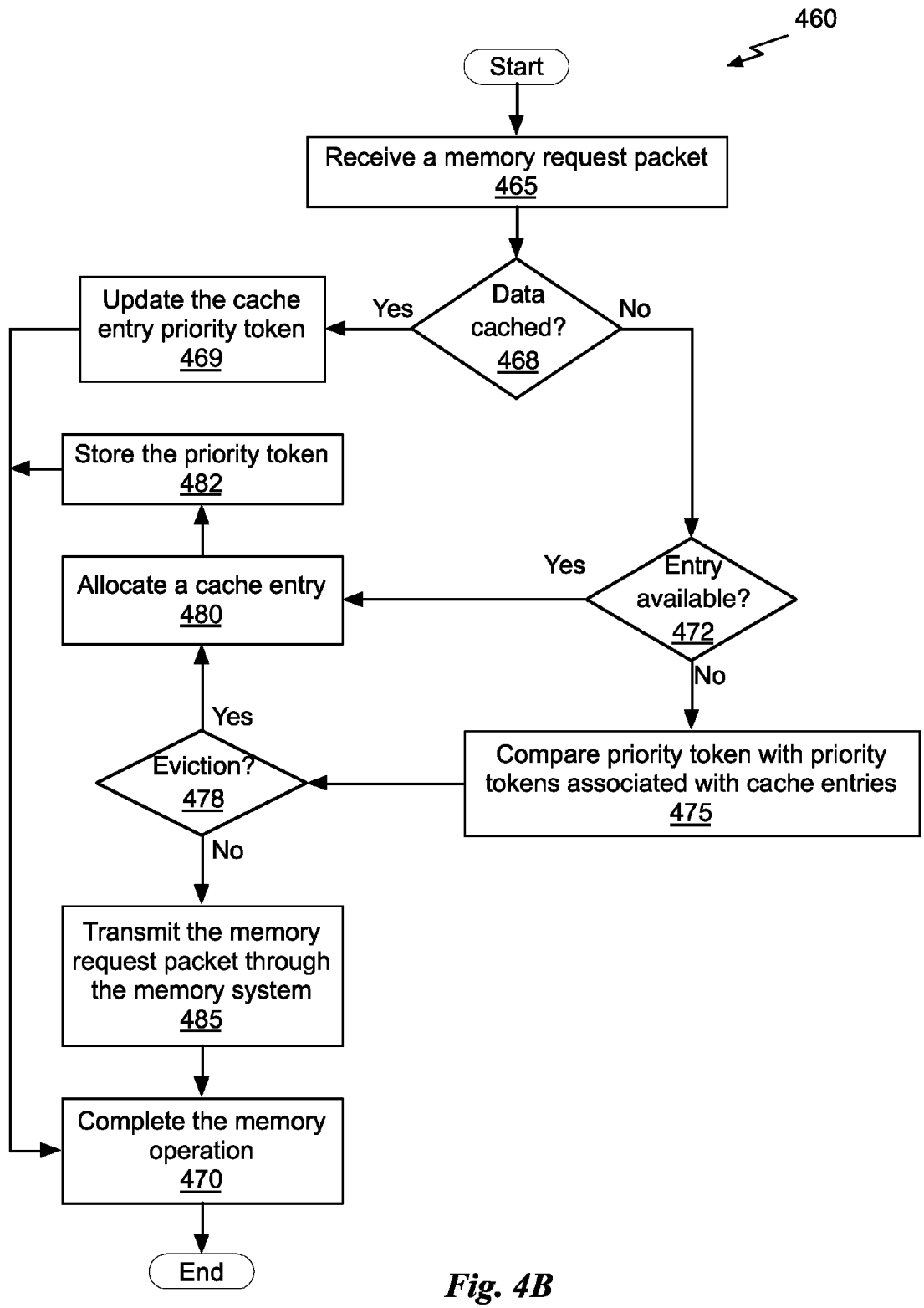
FIG. 4B illustrates a flowchart of a method for caching policies using access priority, in accordance with one embodiment.

FIG. 4B illustrates a flowchart of a method 460 for implementing caching policies using access priority, in accordance with one embodiment. Although the method 460 is described in the context of the texture unit/L cache 390, the method 460 may also be performed by a program, custom circuitry, or by a combination of custom circuitry and a program.

At step 465, a memory request packet 422 arrives at the cache control unit 445. At step 468, the cache control unit 445 determines if the requested data is cached in the cache storage unit 450 (i.e., a cache hit). If the data is available, at step 469, the priority token associated with the cache entry storing the requested data is updated to reflect the priority of the request when the priority token(s) 405 in the memory request packet 422 is a higher level than the token priority associated with the cache entry. At step 470, the memory operation specified by the memory request packet 422 is completed. Otherwise, at step 472, the cache control unit 445 determines if an entry is available in the cache storage unit 450 to allocate for completing the memory operation specified by the memory request packet 422.

If an entry is available, at step 480, the entry is allocated and, at step 482, the priority token(s) 405 included in the memory request packet 422 are stored in the cache control unit 445 or another unit. Otherwise, at step 475, the priority token(s) 405 are compared with the priority tokens associated with the cache entries that are allocated. In one embodiment, a victim with lesser or equal priority compared with the priority token(s) 405 may be selected for eviction. If there is an entry in the cache storage unit 450 that is not allocated to a high-priority thread, the entry can be allocated to a lower priority (or non-token holding) thread. Specifically, at step 478, if the cache control unit 445 selects an entry for eviction based on the relative access priorities specified by the priority token(s) 405, then at step 480, the selected cache entry is allocated and the priority token(s) 405 are stored in the cache control unit 445.

Otherwise, if the cache control unit 445 does not select an entry for eviction (i.e., an entry with lower or equal priority) based on the relative access priorities specified by the priority token(s) 405, then the memory request is prevented from allocating space or filling data into the cache, so that lower priority threads do not contaminate the cache. At step 485, memory request packet 422 is transmitted through the memory system for completion. At step 470, the memory operation specified by the memory request packet 422 is completed.

By granting only selective group of threads access priority for a resource such as the texture unit/L1 cache 390 and/or the L2 cache 265, the threads that have access priority enabled operate as if they have exclusive use of the resource, enabling reduced memory latency, higher memory access bandwidth, etc. Threads that do not have access priority enabled have less chance of using the resource. Therefore cache pollution and cache thrashing are reduced. When using a token priority-based approach for implementing caching policies, scheduling, and communication access, priority tokens may be allocated, assigned, transferred, and released to optimize resource access for performance, throughput, and/or power consumption.

In one embodiment, the priority token(s) 405 are not stored in the cache control unit 445 and memory request packets 422 having a priority token 405 that disables access priority for the texture unit L1/cache 390 are not allocated an entry in the cache storage unit 450, even when an entry is available. However, if data requested by the memory request packet 422 is available in the cache storage unit 450, the data may be provided by the cache storage unit 450 rather than requesting the data from memory. When data that is requested is not available in the cache storage unit 450, the memory request packet 422 is transmitted to the additional memory system units to complete the memory operation.

In addition or assigning priority tokens to threads, the scheduler unit 310 may also be configured to reassign or transfer priority tokens from one thread to another during execution of the threads. In one embodiment, the scheduler unit 310 may be configured to only transfer priority tokens from threads that have exited (i.e., completed execution) and a released priority token is transferred to the oldest thread. In other words, the oldest N threads are assigned priority tokens and once a priority token is assigned to a thread the thread retains the priority token until the thread exits.

In one embodiment, the scheduler unit 310 is configured to release and/or transfer priority tokens before a thread exits. The scheduler unit 310 may employ a round-robin scheme to rotate priority tokens from the threads in one warp to another, as the scheduling priority of the different warps changes, after every i cycles transpire, after i memory requests occur, after every i instructions are executed, or in response to a hardware or software-defined event.

The scheduler unit 310 may be configured to release a priority token when a thread reaches a token-specific instruction, such as a _releaseToken directive that may be inserted into a program by a device driver, compiler, or programmer. Similarly, the scheduler unit 310 may be configured to assign a priority token when a thread reaches another token-specific instruction, such as an _acquireToken directive that may be inserted into a program by a device driver, compiler, or programmer. When a priority token is not available, the thread may wait until a priority token is released. The directive may specify the type of priority token to be acquired or released. In one embodiment, the scheduler unit 310 may be configured to release a priority token when a thread reaches a particular software defined location in a program, such as at a synchronization barrier instruction (i.e., syncthreads) where the threads in a warp wait before continuing execution until each thread in the warp has reached the synchronization barrier instruction.

Figure 5:
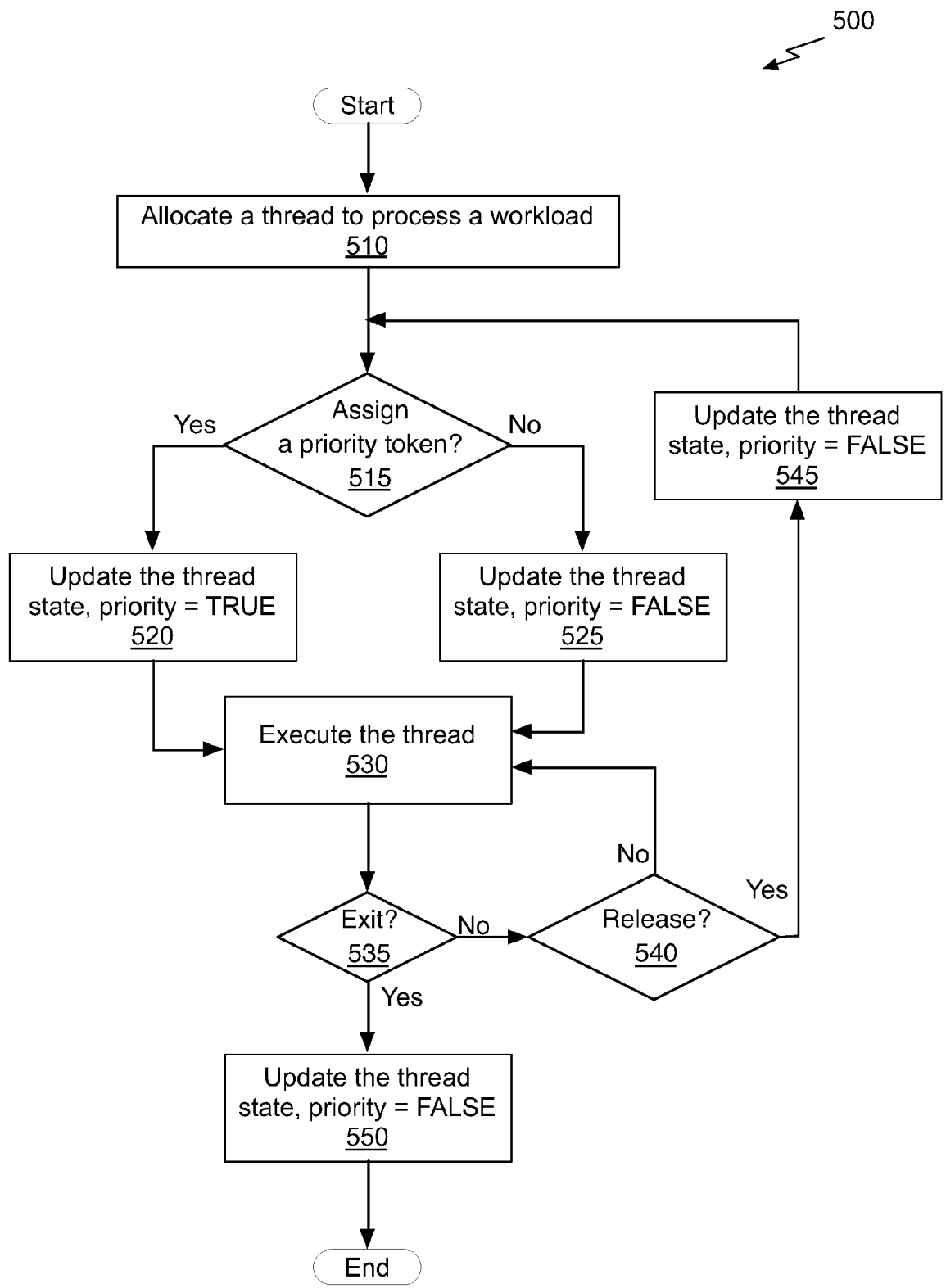
FIG. 5 illustrates a flowchart of a method for providing prioritized access for a thread during multithreaded processing, in accordance with one embodiment.

FIG. 5 illustrates a flowchart of a method 500 for providing prioritized access for a thread during multithreaded processing, in accordance with one embodiment. Although the method 500 is described in the context of a program executed by a processor, the method 500 may also be performed by custom circuitry or by a combination of custom circuitry and a program.

During execution of a thread, priority tokens may be assigned to the thread and released. Execution of the thread may be influenced by the priority tokens that are assigned to the thread. At step 510, a thread is allocated to process a workload. At step 515, the scheduler unit 310 determines if a priority token will be assigned to the thread. If not, at step 525, the thread state corresponding to the thread is updated to set the priority token 405 as FALSE indicating that the thread access priority is disabled for the thread. The priority token may enable/disable access to an individual resource or to a combination of resources.

If the scheduler unit 310 determines that a priority token will be assigned to the thread, then at step 520, the thread state corresponding to the thread is updated to set the priority token 405 as TRUE indicating that the thread access priority is enabled for the thread. The steps 515 and step 520 or 525 may be repeated by the scheduler unit 310 for different types of priority tokens. At step 530, the thread is executed for one or more instructions. At step 535, the scheduler unit 310 determines if the thread has completed execution and exited. If the thread has exited, then, at step 550, the scheduler unit 310 releases the priority token(s) from the thread 520, by updating the thread state corresponding to the thread so that the priority token 405 is set as FALSE indicating that the thread access priority is disabled for the thread. The scheduler unit 310 may then assign each priority token to another thread, thereby transferring one or more priority tokens between threads. The scheduler unit 310 may also allocate the thread to process another workload.

If, at step 535, the scheduler unit 310 determines that the thread has not exited, then, at step 540, the scheduler unit 310 determines if the priority token should be released. When multiple priority tokens are assigned to the thread, the scheduler unit 310 may determine if one or more of the multiple priority tokens should be released. In one embodiment, the scheduler unit 310 may release the priority token when each instruction is executed for the thread. If the priority token (or none of the multiple priority tokens) should be released, then the thread resumes execution at step 530. Otherwise, at step 545, the scheduler unit 310 releases the priority token(s) from the thread 520, before returning to step 515. The scheduler unit 310 releases the priority token(s) by updating the thread state corresponding to the thread so that each released priority token 405 is set as FALSE indicating that the thread access priority is disabled for the thread. At step 515, the scheduler unit 310 may assign one or more of the released priority tokens to the thread or may assign a different priority token to the thread.

The priority token(s) that are assigned and released using the method 500 may influence per-thread or per-warp access for an individual resource or a combination of resources. In addition to a cache memory, resources may include other memory system units and interconnect. More generally, the overall concept of opportunistic use of idle/under-utilized hardware resources, while guaranteeing priority of use to higher-priority entities (e.g., entities to which priority tokens are assigned), can be applied to other areas in computing, such as virtualized server environments. For instance, in a cloud computing environment, a customer may pay extra for guaranteed compute capacity, while leaving resources idle at times which could be opportunistically consumed by other users.

While various embodiments have been described above, it should be understood that they have been presented by way of example only, and not limitation. Thus, the breadth and scope of the present application should not be limited by any of the above-described exemplary embodiments, but should be defined only in accordance with the following and later-submitted claims and their equivalents.

Figure 6:
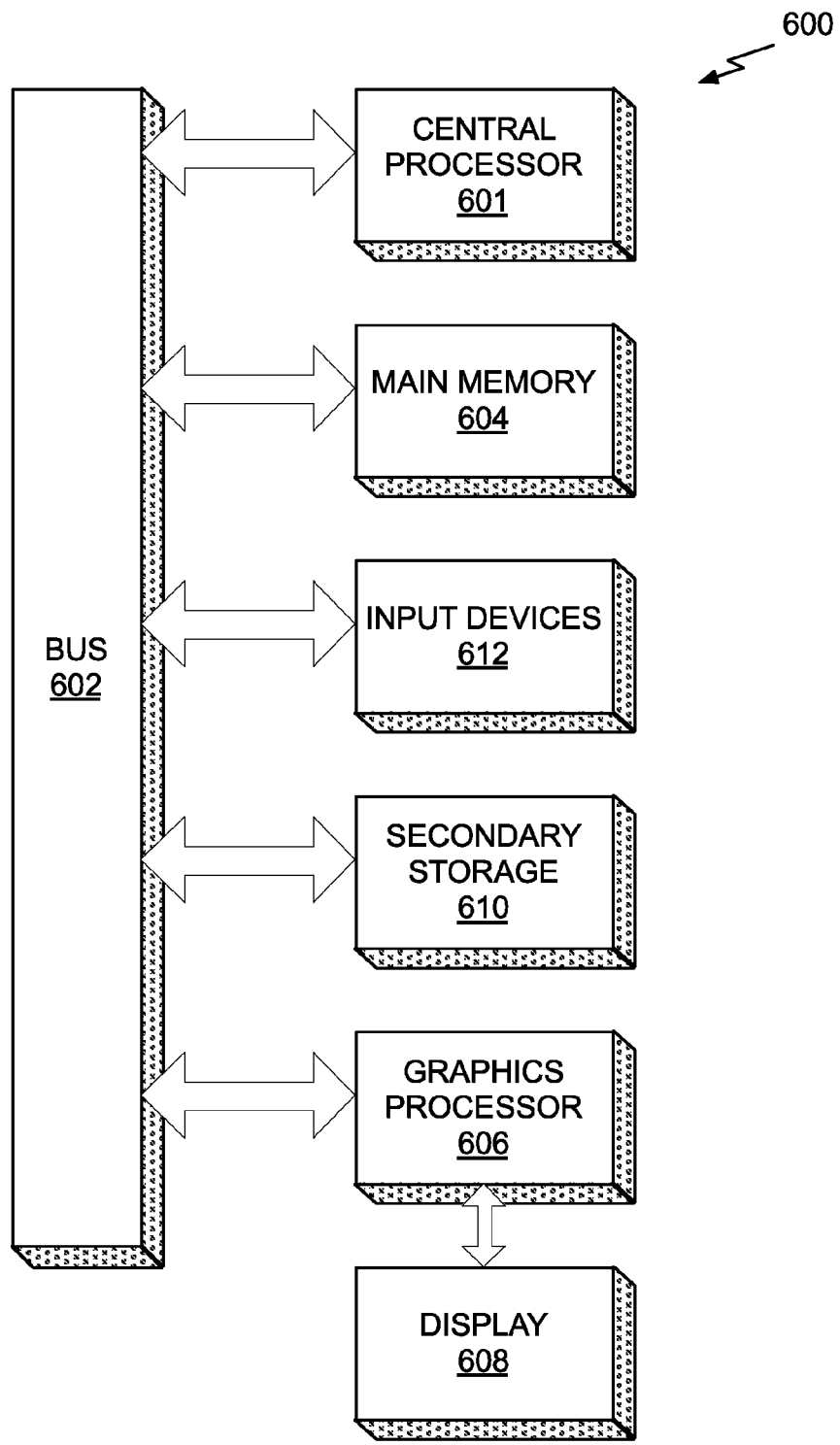
FIG. 6 illustrates an exemplary system in which the various architecture and/or functionality of the various previous embodiments may be implemented.

FIG. 6 illustrates an exemplary system 600 in which the various architecture and/or functionality of the various previous embodiments may be implemented. As shown, a system 600 is provided including at least one central processor 601 that is connected to a communication bus 602. The communication bus 602 may be implemented using any suitable protocol, such as PCI (Peripheral Component Interconnect), PCI-Express, AGP (Accelerated Graphics Port), HyperTransport, or any other bus or point-to-point communication protocol(s). The system 600 also includes a main memory 604. Control logic (software) and data are stored in the main memory 604 which may take the form of random access memory (RAM).

The system 600 also includes input devices 612, a graphics processor 606, and a display 608, i.e. a conventional CRT (cathode ray tube), LCD (liquid crystal display), LED (light emitting diode), plasma display or the like. User input may be received from the input devices 612, e.g., keyboard, mouse, touchpad, microphone, and the like. In one embodiment, the graphics processor 606 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 600 may also include a secondary storage 610. The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 604 and/or the secondary storage 610. Such computer programs, when executed, enable the system 600 to perform various functions. The memory 604, the storage 610, and/or any other storage are possible examples of computer-readable media.

In one embodiment, the architecture and/or functionality of the various previous figures may be implemented in the context of the central processor 601, the graphics processor 606, an integrated circuit (not shown) that is capable of at least a portion of the capabilities of both the central processor 601 and the graphics processor 606, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 600 may take the form of a desktop computer, laptop computer, server, workstation, game consoles, embedded system, and/or any other type of logic. Still yet, the system 600 may take the form of various other devices including, but not limited to a personal digital assistant (PDA) device, a mobile phone device, a television, etc.

Further, while not shown, the system 600 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:
1. A method comprising:
allocating threads to process a workload;
assigning a set of reallocatable priority tokens with different priorities to at least a portion of the threads, wherein access to a resource, by each one of the threads, is based on the priority token assigned to the thread; and executing, by a multithreaded processor, the threads to process the workload, the executing comprising:
 determining that no cache entries are available to store data to complete a memory operation associated with a thread;
 determining that a priority token assigned to the thread is lower priority compared with priority tokens associated with the cache entries; and
 transmitting the memory operation to a memory system to complete the memory operation for the thread.

2. The method of claim 1, wherein the resource is at least one of a storage resource or a communication resource.

3. The method of claim 1, wherein the resource is a cache memory.

4. The method of claim 3, wherein an eviction policy for the cache memory is applied based on the priority token.

5. The method of claim 3, wherein an allocation policy for the cache memory is applied based on the priority token.

6. The method of claim 1, further comprising determining a maximum number of priority tokens in the set.

7. The method of claim 6, further comprising increasing or decreasing the maximum number of priority tokens in the set.

8. The method of claim 1, further comprising acquiring, by a first thread, a priority token when a first instruction is reached during execution of a sequence of instructions.

9. The method of claim 1, further comprising releasing, by a first thread, a priority token when a particular instruction is reached during execution of a sequence of instructions.

10. The method of claim 1, further comprising releasing, by a first thread, a priority token when the first thread completes execution of a sequence of instructions for the workload and exits.

11. The method of claim 1, further comprising storing the priority token assigned to a second thread when a first cache entry is allocated for storing data associated with the second thread.

12. The method of claim 1, further comprising assigning a second set of second priority tokens to at least a second portion of the threads, wherein access to a second resource, by each one of the threads, is based on the second priority token assigned to the thread.

13. The method of claim 12, wherein the resource is a first cache memory and the second resource is a second cache memory.

14. The method of claim 1, further comprising giving scheduling priority for execution to the portion of the threads to which the priority tokens are assigned.

15. A method comprising:
 allocating threads to process a workload;
 assigning a set of priority tokens with different priorities to at least a portion of the threads, wherein access to a resource, by each one of the threads, is based on the priority token assigned to the thread; and
 executing, by a multithreaded processor, the threads to process the workload, the executing comprising:
  determining that no cache entries are available to store data to complete a memory operation associated with a thread;
  determining that a first cache entry is allocated to store data associated with a second thread that has not been assigned a priority token;
  evicting data from the first cache entry when the thread has been assigned a priority token; and
  transmitting the memory operation to a memory system to complete the memory operation when the thread has been assigned the priority token.

16. A system comprising:
a multithreaded processor that is configured to:
allocate threads to process a workload;
assign a set of reallocatable priority tokens with different priorities to at least a portion of the threads, wherein access to a resource, by each one of the threads, is based on the priority token assigned to the thread; and
execute, by the multithreaded processor, the threads to process the workload, comprising:
 determining that no cache entries are available to store data to complete a memory operation associated with a thread;
 determining that a priority token assigned to the thread is lower priority compared with priority tokens associated with the cache entries; and
 transmitting the memory operation to a memory system to complete the memory operation for the thread.

17. The system of claim 16, wherein the resource is a cache memory.

18. A non-transitory computer-readable storage medium storing instructions that, when executed by a multithreaded processor, causes the multithreaded processor to perform steps comprising:
 allocating threads to process a workload;
 assigning a set of reallocatable priority tokens with different priorities to at least a portion of the threads, wherein access to a resource, by each one of the threads, is based on the priority token assigned to the thread; and
 executing the threads to process the workload, the executing comprising:
  determining that no cache entries are available to store data to complete a memory operation associated with a thread;
  determining that a priority token assigned to the thread is lower priority compared with priority tokens associated with the cache entries; and
  transmitting the memory operation to a memory system to complete the memory operation for the thread.

* * * * *